June 24, 1958 C. M. NOBLE 2,840,370

REGISTRATION CONTROL OR INDICATING DEVICE

Filed Aug. 7, 1956 2 Sheets-Sheet 1

Inventor:
Carl M. Noble
By Silverman & Mullin
Attorneys.

REGISTRATION CONTROL OR INDICATING DEVICE

Filed Aug. 7, 1956 2 Sheets-Sheet 2

Inventor:
Carl M. Noble
By Silverman & Mullin
Attorneys.

2,840,370

REGISTRATION CONTROL OR INDICATING DEVICE

Carl M. Noble, Danville, Ill., assignor to Electric Eye Equipment Co., Danville, Ill., a corporation of Delaware Application August 7, 1956, Serial No. 602,562

18 Claims. (Cl. 271—2.6)

This invention relates generally to registration control devices and more particularly is concerned with apparatus for use in indicating or automatically maintaining the precise relationship existing between two functions performed upon a moving flexible web at stations spaced apart. Although not limited thereto, the invention is especially intended for use in connection with apparatus for indicating or automatically and continuously maintaining the color registration in high speed multi-color printing presses, the flexible web in such case being either paper or other flexible material.

This application comprises a continuation-in-part of my application Serial No. 292,373, filed June 7, 1952, and entitled Improved Registration Control Device, now U. S. Patent No. 2,768,827.

The apparatus of this application is shown and described in said copending application, but not claimed therein. The devices illustrated and claimed in said copending application, as well as herein, depend for obtaining the desired control, upon the imprinting of superimposed indicia, using the resulting composite of multiple impressions as a means for activation of photoelectric scanning apparatus.

As pointed out in the previous application, the apparatus which has heretofore been used for indicating or correcting registration error on moving webs of rotary multi-color presses, for example, has been based upon one of the following two methods:

(1) A mark or some indicia is applied to the web at a first printing station, and caused to energize a signal-producing device. This is done, for example, by the use of a scanner in which a beam of light is reflected from the web in the path of the mark into a photoelectric cell. The resulting signal is compared with a second signal produced at a second printing station, as for example, by the position of a printing cylinder relative to another signal producing means.

(2) Marks or indicia are printed on the web at different places by the consecutive printing stations, and caused to energize signal producing means, and the two resulting signals compared.

The first of these methods has the disadvantage that it requires high precision in arranging means for obtaining an accurate signal from the second printing station. Since the printing station is virtually always a rotating printing cylinder, many problems of mechanical and electrical construction arise; the apparatus is bulky and delicate; requires considerable time and skill to be changed during change of cylinders; and requires independent signal producing means.

The second method is also subject to some of the enumerated disadvantages, but additionally interferes with the optimum utilization of the web for the intelligence being printed.

In the said copending application, a structure was described, illustrated and claimed, which depended upon the imprinting of two spaced marks at each of two consecutive printing stations, the spacing of the marks being such that there is an intentional overlapping of the resulting combined marks, having a predetermined relationship for perfect registration, with the relationship changing for changes in registration. For example, the marks are applied by printing cylinders through printing media on diametrically opposite sides of the cylinders, arranged so that the first composite mark formed of the first impression of the first printing cylinder and the first impression of the second printing cylinder has the first color overlapped leading and the second color overlapped lagging considering the direction of movement of the web, with each composite mark formed of three equal zones—first color, combined first and second color, and second color. Then the second composite mark formed of the second impression of the first cylinder and the second impression of the second cylinder has the first color overlapped lagging, and the second color overlapped leading, with the same three zones, but reversed, of course.

Both composite impressions are caused to activate the photo-sensitive cell of a single scanner and the resulting signals are fed through one amplifier to an output stage which has two branches forming comparison means, coupled with an output device of some kind. A switch coupled with one of the printing cylinders alternately renders the two branches receptive to the signals coming from the scanner, and thus each branch is activated by one type of signal. The relative durations of the signals will change with changes in registration, and hence the comparison between the voltage level, for example, in the branches will be a measure of registration. Each branch has a capacitor whose total charge depends upon the duration of the respective signals, the amplitudes of all signals being rendered equal in previous stages.

Coarse register in the structure described and claimed in said copending application can be independently indicated or maintained by simple mechanical timing devices in any well-known manner, leaving the greater accuracy to the structure of the invention. That is also true of the structure of this application.

This invention has several advantages in common with the structure of the copending application. In the first place, only one scanner and one amplifier need be used, thereby decreasing the required apparatus and possible sources of error. In the second place, there is no signal producing device used in connection with a printing cylinder thereby eliminating a substantial source of difficulty and expense. Thirdly, the signal producing marks or indicia occur only on the web of the paper.

The invention described and claimed herein has many additional advantages over those of the copending application, which shortly will be enumerated. This invention depends primarily upon the use of structure which will cause a photo-sensitive device to respond differently to different textures or characters of marks or indicia. Several different ways of doing this are feasible. As one example, the photo-sensitive device may be chosen to respond with different current outputs for different colors, and this may be emphasized by the use of color filters, cross-hatching, Ben-Day or half-tone patterns and the like. Where the differences between two colors are incapable of practical and detectable different responses, the texture or character of the respective indicia may be altered sufficiently by the use of such cross-hatching, Ben-Day or half-tone and the like. Even difference in lateral dimension, i. e. transverse of the direction of movement of the web, may be used. Primarily only one mark or indicia is printed or applied at each cylinder, which is a great simplification.

Objects of the invention include the achievement of the advantages common with the invention of the said copending application.

Further objects of the invention are: the provision of a device or apparatus for indicating or automatically correcting off register in which there are no mechanical or electrical signal-producing means required to be coupled to the printing press other than a single scanner; the provision of apparatus in which the only signal producing means comprises a single scanner which includes photo-sensitive means capable of resolving a composite mark on the moving web which is made up of two individual marks or indicia of different textures or character; the provision of a device in which all control is achieved through the medium of such a composite mark which requires only a single impression or application at each of two consecutive printing stations; the provision of a novel device or apparatus for indicating or automatically correcting off register in which very little of the printing space is occupied by the registration control marks or indicia; the provision of a novel device of the character described in which means are provided to discriminate between the deviation from a predetermined condition of coincidence between the indicia forming the parts of the composite mark both as to amount and direction, in order to provide an output signal or signals usable for obtaining indication or automatic control, as desired.

The invention is advantageously applied to apparatus in which there is a clear track—that is to say, there are sufficient available margins which carry no manifestation of the operations performed by the apparatus. Thus, in the case of printing presses, there would be a border or marginal edge with no printing whatsoever, and the indicia or marks for registration appear in this margin. Under such circumstances, the only registration control apparatus comprises a scanner and its amplifier and output circuit. The scanner will not be affected by the blank border, and there is no need to de-activate the registration control circuit between the composite marks.

The circumstances, especially in the printing industry, are such that it is most often important to use as much of the web as possible for the actual printing matter. In fact, the blank space of the modern press is getting continuously smaller, leaving little or no room for large margins. Because the invention herein requires a minimum of indicia, it is economical of paper, especially where used in connection with de-activating means between composite indicia. It is not difficult to install simple switching means working in conjunction with one of the printing cylinders which de-activates the registration control apparatus for a period that the scanner would normally be exposed to printed matter which might give spurious signals. The switch could be adjusted to ground grids of the amplifier, for example, and to remove the ground for an eighth of an inch before and after the indicia would normally appear. This coarse switching means requires no bulky or sensitive apparatus and can easily be installed wherever needed, and adjusted to coincide with the blank space in which the registration control indicia are to be applied.

Other objects of the invention are concerned with the provision of apparatus immediately above mentioned.

Generally the invention resides in applying two consecutive marks or indicia of different character or texture, say for example the colors yellow and red, at respective printing stations. When in perfect registration, the marks coincide, at least in the direction of movement of the web to which applied. When scanned by a light beam and reflected to a photo-sensitive device, the resulting signal passed through an amplifier and discriminating circuit will indicate perfect registration, or in the alternative, will not activate registration correcting apparatus. When the printing, as in this case, occurs out of registration, also causing the indicia printed at the respective stations to be out of registration, there will be overlap of the otherwise coincident indicia. The composite signal will therefore have a red overlap at one end and a yellow overlap at the other end, and depending upon whether the imprint of the second impression is leading or lagging the first, either the yellow or the red overlap will be at the leading edge of the composite mark, and the other color will be at the opposite or trailing edge of the composite mark.

The photoelectric device in the scanner is, in this case, made sensitive to the different colors and the combination thereof. This can be done by the use of filters, or different character of printing, or even by difference in the lateral area of the indicia applied. In any event, and continuing with the example using yellow and red, the signal output from the scanner will have three parts, each of different amplitude. The minimum amplitude will occur as the yellow indicia passes the scanner, the maximum as the red and yellow combined pass, and the red will provide an intermediate amplitude.

This composite signal is then passed through an electronic circuit which has resolution characteristics sufficient to discriminate between the amplitudes of the parts of the signal and act upon an output device accordingly. Whether the output device is an indicator such as a measuring bridge with a null meter, or a reversible motor with amplidyne control of the length of the web between printing stations, or any other means is immaterial to the invention. Any such output device requires proper signals to operate the same, and the ability of the circuit to provide such signals is referred to herein as the ability to detect off register, both as to amount and direction. The circuit which is illustrated and described hereinafter is intended to be driven or actuated by the trailing end of the composite signal produced by the scanner. By suitable changes in the circuit, especially in the case that a clear track apparatus is not used, the leading end of the composite signal could be used.

When one impression leads the other the trailing edge of the composite scanner signal will be either the minimum amplitude (yellow) or the intermediate amplitude (red) and the duration of that signal will be the extent of lead. The discriminating circuit has the ability to detect this information and act accordingly upon the output device.

The invention will be best understood by referring to the drawings in which a preferred embodiment has been illustrated to aid in the explanation of the best manner of carrying out the invention, from an examination of which the advantages and features of the invention will become known and clearly understood by those skilled in this art. The drawings are for the most part diagrammatic in character, and conventional symbols are used to designate well-known elements and structure, without intending to limit the invention specifically to such elements and structure only as defined in the claims.

In said drawings:

Fig. 1 is a schematic view illustrating a circuit diagram of the amplifier, discriminating means, and certain other parts of the invention, showing the manner in which the indicia produce signals which are amplified and detected and caused to operate indicating or correcting output means. Also illustrated in this view is a structure used to de-activate the apparatus between appearance of the indicia, as where there is no clear track.

The invention is described herein in connection with color printing by means of high speed multi-color presses. This is not intended as a limitation on the invention, since the application thereof to other fields is perfectly feasible and intended to be included in the scope thereof. Furthermore, the flexibility of the web of paper which passes through a printing press is in no way required of other applications of the invention, it being possible to apply the teachings of the invention to apparatus in which the web is relatively stiff, as for example, metal, and the indicia applied are not necessarily printed, but are some manner of punchings.

Another factor which is of interest is that the invention as shown and described herein is illustrated in connection with the registration of only two colors. The usual high speed color press of modern typography must print three and sometimes four colors, all in registration. It is required that there be control between all printing stations, and the usual installation will include three or more of the independent registration control devices. Apparatus which provides only an indication of off register is usually limited to proof presses or smaller presses where correction of registration may be achieved through manual means using indication information to ascertain the amount of correction to apply.

Figure 1:
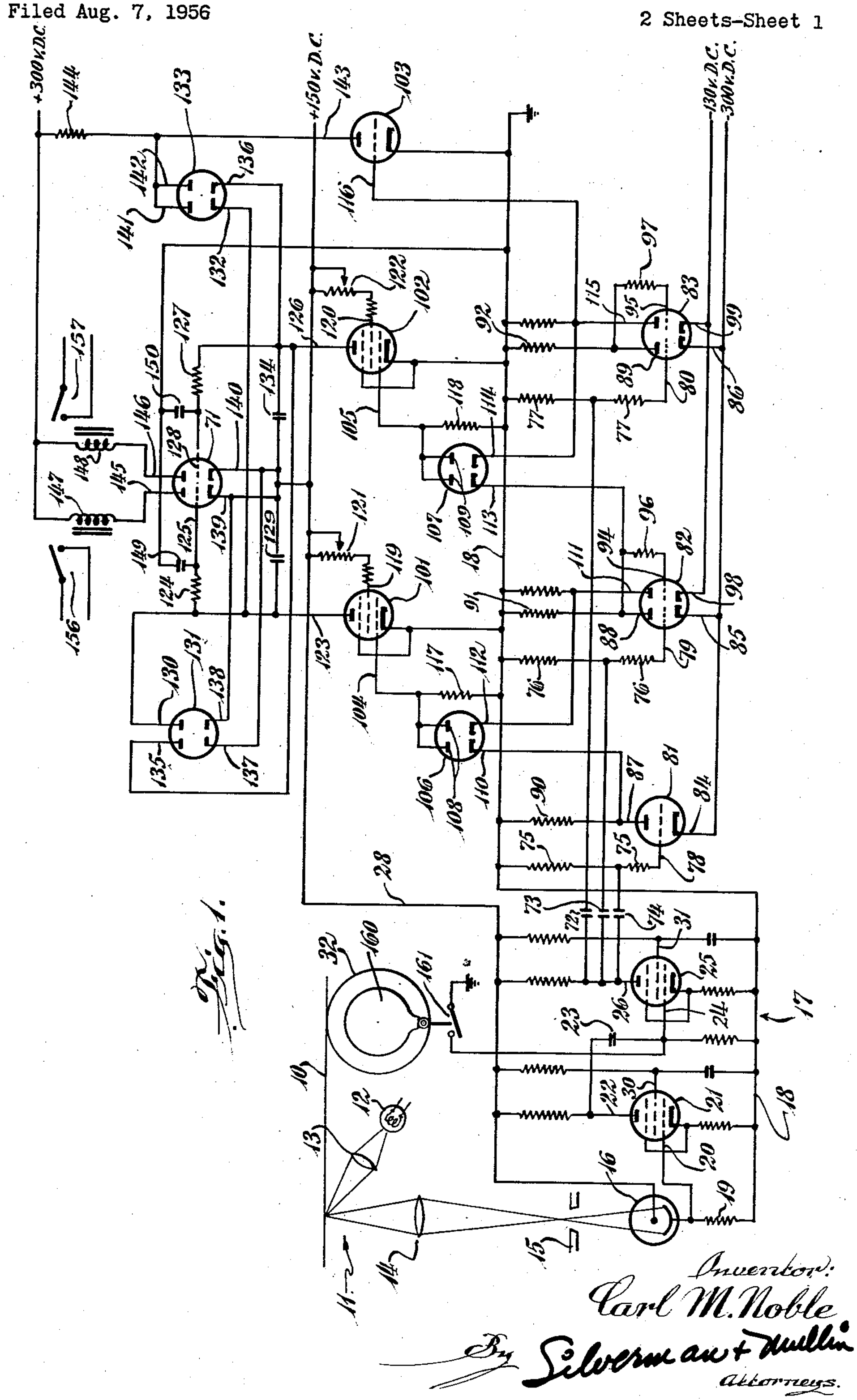

In Fig. 1 there is illustrated a moving web which is designated 10, which has had indicia or marks printed thereon. The web 10 moves past the scanner which is designated generally 11, and which basically consists of a source of light such as a lamp 12, directing a beam of light through a collimating lens or system of lenses 13 upon the web 10, the beam being reflected from the web through another lens or system 14 and focused at an iris or mask 15 behind which there is disposed a photosensitive device comprising a photoelectric cell 16.

The scanner 11 may or may not include other elements in the same housing. For example, an amplifier 17, or preamplifier as it might be termed, could be positioned closely adjacent the optical portions of the scanner 11. The amplifier 17, in any event, is a two-stage resistance coupled electronic device which is illustrated in Fig. 1. Any other type of amplification may be used, providing the frequency response is sufficient to meet the requirements which are pointed out below. The photoelectric current flows to ground 18 through a resistor 19 the upper end of which is directly coupled to the grid 20 of the pentode 21. The output of the pentode 21 is coupled from the plate 22 through the coupling capacitor 23 to the grid 24 of the second pentode 25 and the output of this tube appears at its plate 26 as a signal above ground.

It will be noted that the lead 28 is at some positive voltage above ground, such as for example, 150 volts D. C. and that the plates 22 and 26, and the screen grids 30 and 31 are maintained at suitable voltages by dropping resistors connected to this lead. The conventional elements such as the dropping resistors, suppressors, screen grid by-pass condensers, and cathode bias resistors are not designated by reference characters since their functions and operation are conventional and well-known.

Prior to continuing with the explanation of the discriminating means or the detecting portion of the circuit, it is desired to consider the nature of signal which is applied to the amplifier 17 by the scanner 11.

Figure 2:
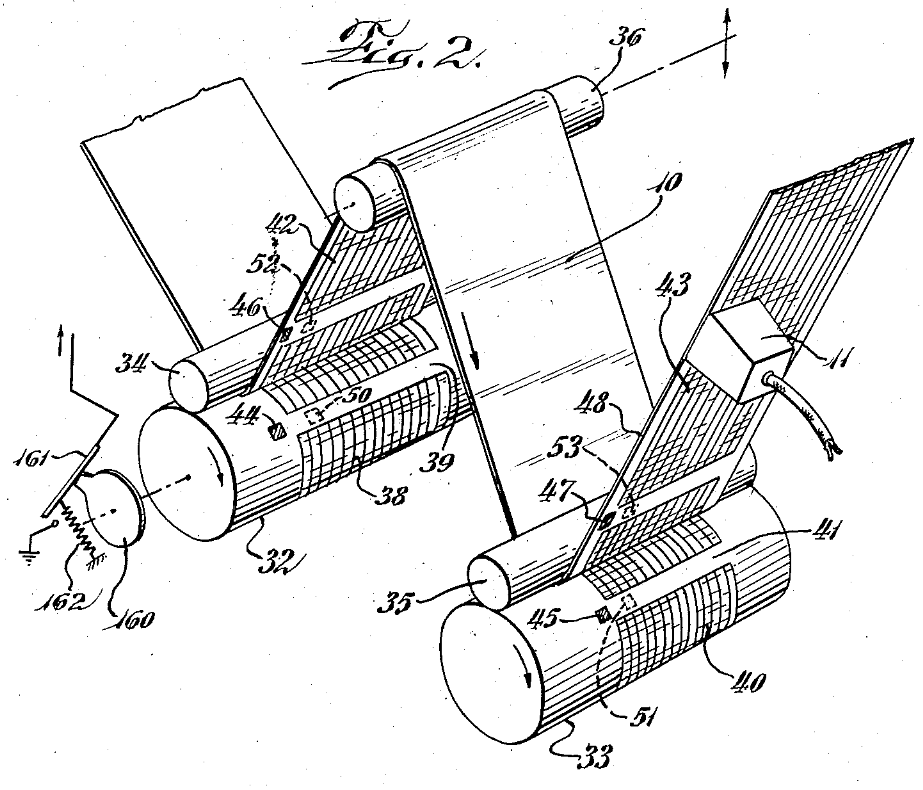
Fig. 2 is a generally diagrammatic view showing the application of the marks or indicia to the moving web by printing cylinders.

Referring to Fig. 2, there are illustrated two printing stations of a high speed multi-color printing press. The arrows indicate the direction of rotation of the printing cylinders 32 and 33 and the web 10. A substantial amount of equipment and apparatus, such as for example, ink driers and the like, is not illustrated, but bare essentials are shown. Thus, each of the printing cylinders 32 and 33 has a back-up roller as shown at 34 and 35, to direct the passage of the web 10 into printing engagement with the respective printing cylinder. An intermediate compensating roller 36 is illustrated and it will become obvious that raising or lowering this roller will either increase or decrease the span of the web 10 between printing stations and thereby change the registration of the printing matter applied by the respective stations. This function is indicated by the double ended arrow shown at the end of the projected axis of the roller 36. It is desired to point out that the apparatus to raise or lower this roller is well-known, and in most cases merely requires the operation of a reversible electric motor in one direction or the other.

The printing is accomplished on the bottom surface of the web 10, as here illustrated, and usually will be applied by substantially the entire area of the cylinder. The diagram of Fig. 2 is highly simplified. Cylinder 32 has an etched or engraved or otherwise applied printing area 38 which may be continuous or split in one or more places. In the illustration, it is presumed that the printing area 38 is split to provide a separation 39. The cylinder 33 therefore will have an identical printing area 40 and a similar split or space 41 between parts, or between the beginning and end of the area. Thus, when ink has been suitably spread by conventional means (not shown), the area 38 will imprint the first impression 42 in one color—say, yellow—and the area 40 will imprint the second impression in another color—say, red—immediately upon the first impression, giving rise to the composite impression 43 made up of two separate color printings.

There is provided upon each cylinder a mark-printing area to print the marks or indicia needed for the operation of the invention. The cylinder 32 has a mark-printing area designated 44 and the cylinder 33 has an identically positioned mark-printing area designated 45. Obviously the area 44 will cause a mark or indicia 46 to be printed on the web 10 in fixed relation to the impression 42, while the area 45 will cause a mark or indicia to be printed on the web 10 which will be in fixed relation to the impression applied by the area 40. Since the area 45 is required to print over the mark 46, the resulting composite mark or indicia will be a two-color impression 47.

The description thus far has not mentioned the positioning of the printing areas 44 and 45, and in truth, where they are placed in the border as shown in the figure, and the resulting impressions 46 and 47 appear along a clear margin 48 there is no need to position the areas 44 and 45 any particular place. So long as the relationship to the printed areas 38 and 40 are respectively identical, it is of no consequence where they appear. This is known as clear track printing of the registration control marks.

It is more usual to have the control marks appear within the side limits of the printing area, hence utilizing the clear border 48 otherwise wasted, for printing. For example, the cylinder 32 would have a mark-printing area shown in broken lines at 50 for example in the space 39, and the cylinder 33 would have a similar mark-printing area shown in broken lines at 51 in the space 41. Then the first area would print the mark 52 and the composite mark of the two impressions would be at 53, both shown in broken lines. In such case, it would be necessary to de-activate the registration detection apparatus for all the time that the printed areas are being scanned by the scanner 11, and to activate the apparatus only when the clear spaces between consecutive composite impressions 43 (or the clear space corresponding to the space 41) pass the scanner. This is done in a manner shortly to be explained.

Figure 3:
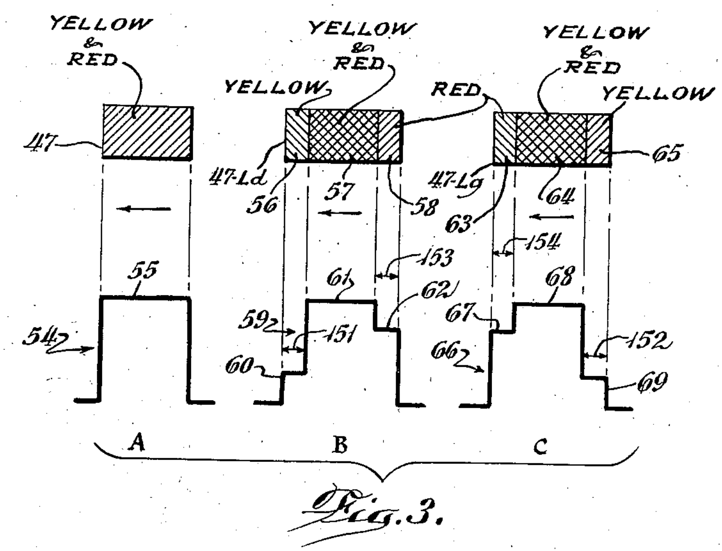
Fig. 3 is a diagrammatic view showing the relationship between signals produced by the marks or indicia for the various conditions of lead, lag and in registration.

Considering now Fig. 3, there are illustrated three conditions of registration, showing the marks or indicia, as well as the output of the scanner 11 and its associated amplifier 17. The mark-printing areas 44 and 45 are identically positioned so that in perfect registration, the resulting composite mark or indicia 47 has the appearance of the rectangle shown at the top of Fig. 3A. Since this is a combined impression of yellow and red (or other different textures) the response of the photoelectric cell 16 will be uniform over the entire signal and will give maximum amplitude. This signal is designated 54 and its plateau 55 is flat. This represents perfect registration, and under these circumstances there is no indication of off register, or no actuation of registration correction mechanism.

If the web 10 is too short, as caused by any of a large variety of reasons well-known in the art, the first impression 46 will reach its printing position at the second station before the impression applied by the printing area 45, and hence the first impression will "lead" the second giving rise to the composite mark 47–L*d* which is formed of a leading yellow part 56, a central red and yellow combined part 57, and a lagging red part 58. The resulting signal 59 which will be passed by the scanner and amplifier 17 will have the wave form at the bottom of Fig. 3B. There will be a first part 60 whose plateau corresponds to the minimum amplitude and whose duration is the same as the duration of the yellow part 56 passing the scanner; there will be a middle part 61 whose plateau will be of the same amplitude as plateau 55 corresponding to the part 57 of red and yellow passing the scanner, and of like duration; and finally there will be a stepped-down part 62 whose plateau corresponds to the intermediate read color amplitude corresponding to the trailing part 58 and of like duration.

In the same manner, when the lighter color yellow is trailing, the web 10 being too long, the resulting composite mark 47–L*g* has similar parts, but in reverse order, with the red part 63 first, followed consecutively by the red and yellow part 64 and the yellow part 65. The signal 66 also conforms, with the leading part 67 of medium amplitude, the central part 68 of maximum amplitude, and the trailing part 69 of minimum amplitude. The duration of the parts corresponds to the duration of passage of the respective parts of the mark 47–L*g* past the scanner 11.

In order for the wave form to be used, as it is in this invention, the amplifier 17 must have sufficient frequency response to pass the signals 59 and 66 without distorting the configuration thereof such that the discriminating circuit cannot distinguish between the parts of each signal. This is not a very stringent requirement, since the speed of modern color presses is of the order of 500 feet per minute and the length of the indicia or marks along the direction of movement is of the order of three eighths of an inch.

Referring now to Fig. 1, it will be seen that the discriminating and detecting circuit comprises a number of electronic tubes which distinguish between the parts of the signals applied by the amplifier 17 and thereby react upon one or the other sections of the output twin-triode 71, or neither.

The signal caused by the passage of the composite mark or indicia 47, 47–L*d* or 47–L*g* appears at the plate 26 of the tube 25. It is coupled through respective capacitors 72, 73 and 74 to three voltage dividers 75, 76 and 77 to the grids 78, 79 and 80 of three electronic tubes 81, the left section of tube 82, and the left section of the tube 83. The cathodes 84, 85 and 86 of these three tubes are all connected to a very high negative bias, such as for example −300 volts D. C. and have their plates 87, 88 and 89 connected to ground 18 through voltage dropping resistors 90, 91 and 92 respectively. This arrangement causes the tubes 81 and the left hand sections of tubes 82 and 83 to be conducting at all times with substantially saturation current. During conduction the voltages appearing at the plates 87, 88 and 89 are low, and in the event that any of these tubes are cut off, as will be described, the voltage at its plate will rise.

The voltage dividers 75, 76 and 77 have the values of their resistance so chosen that the following conditions prevail:

(1) With no signal appearing at the plate 26, tube 81 and the left hand sections of tubes 82 and 83 are conducting saturation current.

(2) A signal appearing at the plate 26 corresponding to the lighter color, that is having the amplitude of the parts 60 and 69 of the signals 59 and 66 respectively has no effect upon the left hand sections of the tubes 82 and 83 but will cut off the tube 81.

(3) A signal appearing at the plate 26 corresponding to the draker color, that is having the amplitude of the parts 62 and 67 of the signals 59 and 66 respectively has no effect upon the left hand section of the tube 83 but will cut off the left hand section of the tube 82, and of course the tube 81.

(4) A signal appearing at the plate 26 which is the maximum signal amplitude, corresponding to both colors, and having the amplitude of plateau 55 or part 61 or part 68 will cause the left hand section of the tube 83 to be cut off along with the left hand section of the tube 82 and the tube 81.

The plates 88 and 89 are connected to the grids 94 and 95 respectively of the right hand sections of the tubes 82 and 83 through resistors 96 and 97. The cathodes 98 and 99 of these sections are maintained at a voltage level which, while quite negative, is nevertheless substantially higher than the potential of the cathodes 85 and 86. This could be, for example −130 volts D. C. Thus, the right hand sections of the tubes 82 and 83 react oppositely to the left hand sections. When the left hand section of either tube is conducting saturation current, its right hand section is cut off, and when the left hand section of either tube is cut off, its right hand section is conducting saturation current.

Three control tubes are provided, namely the pentodes 101 and 102 and the triode 103. The tube 101 can conduct only if its grid 104 is properly biased, and this is also true of tube 102 and its grid 105. Bias for these grids is obtained from twin diodes 106 and 107 respectively, the plates 108 of diode 106 being connected to the grid 104 and the plates 109 of the diode 107 being connected to the grid 105. The plate 87 of the tube 81 is connected to the cathode 110 of the diode 106 and the plate 111 of the right hand section of the tube 82 is connected to the other cathode 112 of the diode 106. The plate 88 of the left hand section of the tube 82 is connected to the cathode 113 of the diode 107 and the other cathode 114 of the diode 107 connects with the plate 115 of the right hand section of the tube 83. Note that the same plate 115 also connects directly to the grid 116 of the control tube 103.

From the circuit described it will be seen that the grids 104 and 105 depend upon the potential across the diodes connected thereto. For example, if either of the sections of the diode 106 provides a potential to the grid 104 which is below cutoff then the tube 101 cannot conduct. In like manner, both sections of the diode 107 must also be conducting for the tube 102 to pass current.

Considering now the operation of the circuit thus far, if the minimum (yellow) signal appears at the plate 26, the tube 81 is cut off, but the left hand sections of the tubes 82 and 83 are conducting. Thus, the potential at the plate 87 is high, the potential at the plate 88 is low, the potential at the plate 111 is high, the poential at the plate 89 is low, and the potential at the plate 115 is high. Since cathodes 110 and 112 are at high potential, the tube 101 will conduct for the duration of the minimum signal. Since the cathode 113 is at low potential, tube 102 remains cut off. Tube 103 is conducting during this signal, as it is during the intermediate (red) signal amplitude.

When a medium amplitude signal appears, tube 81 and the left section of tube 82 being cut off, the plate 111 assumes a much lower potential, and the tube 101 no longer conducts because the cathode 112 is also at low potential. On the other hand, the cathodes 113 and 114 are now both at the high potentials of the plates 88 and 115 and so the tube 102 conducts for the duration of the intermediate (red) amplitude signal.

The tubes 101 and 102 have grid leak resistors 117 and 118 and the usual connections to suppressors, etc.

Each of the screen grids 119 and 120 is connected to a B supply of, say, 150 volts D. C. through variable resistors 121 and 122 respectively by means of which the amount of current flowing through these tubes for the duration of conduction can be adjusted.

The plate 123 of the tube 101 connects through resistor 124 to the grid 125 of the left hand section of the output tube 71, and the plate 126 of the tube 102 connects through the resistor 127 to the grid 128 of the right hand section of the output tube 71. The plate 123 is also connected to the left hand side of the condenser 129, to the plate 130 of the right hand section of twin diode 131, and to the cathode 132 of the left hand section of the twin diode 133. The plate 126 is connected to the right hand side of the condenser 134, the plate 135 of the left hand section of the twin diode 131 and the right hand cathode 136 of the twin diode 133. The condensers 129 and 134 as well as the cathodes 137 and 138 of the twin diode 131 and the cathodes 139 and 140 are all maintained at positive 150 volts D. C. through suitable connections. The plates 141 and 142 of the twin diode 133 are connected to the plate 143 of the control tube 103 which obtains its plate potential from a high voltage line of, say, 300 volts D. C. through a plate dropping resistor 144. Plates 145 and 146 of the output tube 71 also connect with the 300 volt D. C. line through the respective solenoid windings 147 and 148. The grids 125 and 128 are by-passed signal-wise to ground through condensers 149 and 150.

When the control tube 101 conducts, caused by the appearance of a low amplitude signal, a negative charge is applied to the condenser 129, the amount of which is controlled by the resistance of the variable resistor 121, and the time duration of the signal (yellow). The duration of the signal is of course caused by the amount of distance by which the impressions of the respective stations are off register. This distance is indicated in Fig. 3B at 151 and in Fig. 3C at 152. Presuming that the length of both marks or indicia is the same, the front and rear overlap of the lighter (yellow) and darker (red) colors will be identical. Whether the device is to respond to the leading or lagging part of the signal would thus be immaterial. Mention will be made hereinafter of variations from this arrangement, but it should be understood that the structure described specifically herein requires the indicia applied at each printing station to be the same length, and operates on the trailing end of the signal as will be explained.

When the control tube 102 conducts, as caused by a signal from the darker color, the condenser 134 is charged negatively by an amount depending upon the duration of the signal, for example 153 or 154 in Figs. 3B and 3C, and the value of the resistance of the variable resistor 122.

The both sections of the tube 71 are normally conducting and hence the solenoid windings 147 and 148 are normally carrying current. The relay switches 156 and 157 can be open for this condition prevailing. The appearance of a negative charge on either of the condensers 129 or 134 will serve to lower the potential at the respective grids 125 and 128 and thereby decrease the flow of current through the solenoid windings 147 or 148 as the case may be. This may close the respective circuit through switch 156 or 157 and energize a motor (not shown) to drive mechanism to raise or lower the roller 36, thereby automatically correcting for off register.

The twin diode 131 serves to keep the condensers 129 and 134 at the 150 volt D. C. level under normal circumstances.

Attention is now directed to the control tube 103 and its associated circuitry. As previously explained, this tube is normally conducting. When a maximum amplitude signal (red and yellow combined) appears at the plate 26, for the duration of that signal the left hand section of the tube 83 is cut off, the right hand section of the tube carries saturation current and the potential at its plate 115 drops, causing the tube 103 to be cut off. The plate 143 thus rises in potential thereby applying a high potential to the both sections of the diode 133. Thus, with the tube 133 conducting, it can discharge the condensers 129 and 134, raising the potential of these condensers (their charge having been negative) to the value limited by the diode 131. This represents a "re-setting" of the condensers 129 and 134, and the effect is to raise the potential on the grids 125 and 128 thereby again causing both tubes to conduct and the relay circuits associated therewith to open.

Obviously, when the only signal which is passed through the amplifier 17 is that of Fig. 3A, nothing will occur to the relay circuits of the output tube 71. In case the output of the tube is connected to an indicating device, either in a simple bridge circuit or any other indicating means, the indicating means will register zero signifying that the printing impressions are perfectly in register.

When a signal such as shown in Fig. 3B or 3C is passed, any effect caused by the first portion 60 or 67 of the signal will be "wiped out" by the appearance of the maximum amplitude signal. To assure that there will be no substantial change in the flow of current through the tube 71, the grids 125 and 128 have the series resistors 124 and 127 shunted to ground by the filter condensers 149 and 150, the time constants of which are chosen to prevent immediate response of the grid to the passage of the first part of the signal, whether of the minimum amplitude or the intermediate amplitude. After the passage of the center portion of the signals of Figs. 3B or 3C the trailing edge portion of the signal will cause either the tube 101 or the tube 102 to conduct.

If the trailing portion of the signal is minimum (yellow) in the apparatus illustrated, then the left hand section of the tube 71 has its current flow decreased and closes the circuit of the relay switch 156 causing the roller 36 to be lowered to compensate for the lag of the yellow impression (Fig. 3C). If on the other hand the trailing portion of the signal is of intermediate amplitude (red), then the right hand section of the tube 71 has its current flow decreased and closes the circuit of the relay switch 157, causing the roller 36 to be raised to compensate for the lead of the yellow impression. The variable resistors 121 and 122 will control the amount of off register which can be tolerated by the circuit without causing operation of relays and hence are sensitivity control means.

It is pointed out that the charge placed upon the condensers 129 or 134 by the trailing portion of the signals is not leaked off but is retained until the next signal appears, and hence the time constant of the filters on the grids 125 and 128 can be as long as needed to assure that the leading portion of the signal will not affect the correction or indication means.

It is conceivable under special circumstances that it may be desirous to have the leading portion of the signal passed by the amplifier control the operation of the circuit, and in this case the discriminating and detecting portion of the circuit will require changes to enable this to be accomplished.

The circuit described requires that the indicia or marks both be the same length so that the durations of the overlap front and back are the same, but this is not essential to the operation of the invention. Since the circuit first discriminates between the parts of the signal on the basis of amplitude through the use of the tubes 81, 82, 83, 106, 107, 101 and 102, it is a relatively simple matter to change the circuit constants to handle signals in which the lengths, i. e. durations, of the two marks forming the composite 47 are different. Obviously it is simpler and preferred to accomplish the results with equal length marks.

As previously stated, the apparatus of the invention is more economical of paper where a clear track is not used, as with the marks or indicia such as 50 and 53. In this instance, a simple cam 160 may be coupled to rotate with the cylinder 32, synchronized with the etched portion 38 so that the switch 161 which is normally maintained in grounded closed condition as by a spring 162 is opened for the time that the space which carries the composite marks 53 passes before the scanner 11. The opening of the switch 161 removes the ground from the grid 24 of the tube 25 and permits the amplifier 17 to pass signals which it otherwise could not do. Many other ways of so de-activating the apparatus can be used with simple and non-critical cams and switches such as illustrated and described.

The variations alluded to are not the only changes and alterations that can be made without departing from the spirit and scope of the invention as defined in the claims.

I claim:

1. A registration control or indication device for use with apparatus operating upon a moving web, said apparatus including a first operating station and a second operating station spaced along the web, means at each station for functionally operating upon said web with the resulting effect being a continuous registered manifestation of the operations of the respective stations, means for applying a first discrete indicia of a first detectable character at the first station, means for applying a second discrete indicia of a second and different detectable character at the second station, the applying means having substantially the same positions relative the respective operating means and the stations being spaced apart an amount such that when registration of the consecutive operations has been achieved, the two consecutively applied indicia will have at least a portion thereof superimposed with predetermined spatial relation between one of the ends of the two indicia and said superimposed portion considering the direction of movement of the web, the superimposed portion having a third detectable character comprising the combination of the two first mentioned characters, a single sensing device juxtaposed relative the web and having the applied indicia passing the same on a single track to enable detection of the passage thereof and producing a different electrical signal in said sensing device for each of the said characters, and discriminating means activated by said signals for detecting the departure, if any, from said predetermined spatial relationship as a measure of the departure if any of said operations from registration.

2. A registration control device for use with apparatus operating upon a moving web, said apparatus including a first operating station and a second operating station spaced along said web, means at each station for functionally operating upon said web with the resulting composite effect being a registered manifestation of the operations of the respective stations, means for applying a first discrete mark of detectable character at the first station and means for applying a second discrete mark of a second detectable character at the second station, the stations being spaced such that, when registration is achieved, the two marks will be superimposed to form a discrete composite mark with substantially no overlap at one end, at least, of the resulting composite mark in the direction of movement of the web, a single sensing device for producing signals as a result of the passage of said composite mark along a single track relative thereto and said sensing device being sensitive in different degree to each of the different characters of the first and second marks and to the character of the marks superimposed one on the other, and discriminating means activated by signals from the sensing device for detecting departure from registration through the detection of the amount of overlap at said one end produced by superimposed marks when the operations are out of registration, said discriminating means being inactive when the operations are in registration.

3. A device as claimed in claim 1 in which said first and second indicia are of equal length in the direction of movement of the web and in which said indicia are longitudinally coincident when said operations are in registration, and there is an overlap of equal length but of one or the other of said first and second marks at opposite ends of said consecutively applied indicia with a central portion of said third character, when said operations are not in registration.

4. A device as claimed in claim 1 in which said first and second indicia are congruent quadrangles of different reflective properties with respect to said sensing means and a light source is disposed to reflect light from said indicia to said sensing means, the quadrangles adapted to coincide when consecutively applied and the operations are in registration, but overlapping on the ends thereof when said operations are not in registration.

5. In a registration control or indication device in which means are provided for detecting deviations in registration upon a moving web element, there being two operating stations along the web element and each adapted to perform an operation upon said web element consecutively and in registration, the improvement which comprises means applying first and second indicia at the respective stations, the indicia having at least a portion of each superimposed and forming thereby a composite indicia, each of said first and second indicia having a trailing end and the trailing ends having predetermined spatial relation in said composite indicia long the direction of movement of the web element for in-registration condition of said operations, a single sensing means fixed relative the web element and scanning the indicia along a single longitudinal track, responsive to produce different electric signals for each of said first and second indicia and the superimposed portion of said composite indicia, electrical means activated by said signals from said sensing means and discriminating therebetween, means responsive to said discriminating means and detecting the variance from said predetermined spatial relation, if any.

6. In a registration control or indication device in which means are provided for detecting deviation in registration between consecutive operations performed upon a web element moving past two spaced operating stations, the improvement which comprises means at each station applying a discrete indicia to said web along a single scanned track in substantial coincidence to provide a composite discrete indicia made up of a first light reflective mark and a second light reflective mark of different optical properties, an optical scanner having a single photo-sensitive signal producing means responsive in different degree to light reflected from said first and second marks, and in a third degree to light reflected from any area of said composite indicia in which said marks are superimposed, the marks having the same length relative the direction of movement of the web element and being spaced to coincide in said composite indicia when registration in operations is achieved, but overlapping respectively on opposite ends of said composite indicia when the operations are not in registration, means discriminating between the portions of the composite signal from said scanner produced as a result of the passage of said composite indicia, and means detecting whether there is overlap and of which mark.

7. A structure as claimed in claim 6 in which said detecting means also detects the degree of overlap.

8. In a registration control or indication device in which means are provided for detecting deviation in registration between consecutive operations performed upon a web element moving past two spaced operating stations, the improvement which comprises means at each station applying indicia to said web in substantial coincidence to provide a composite indicia made up of a first light reflective mark and a second light reflective mark of different optical properties, an optical scanner having photo-sensitive signal producing means responsive in different degree to light reflected from said first and second marks, and in a third degree to light reflected from any area of said composite indicia in which said marks are superimposed, the marks having the same length relative the direction of movement of the web element and being spaced to coincide in said composite indicia when registration in operations is achieved, but overlapping respectively on opposite ends of said composite indicia when the operations are not in registration, said photo-sensitive signal producing means being activated upon passage of said composite signal to produce a wave form having a portion of one amplitude for any said area of superimposed marks with a duration proportional to the length of said area of superimposed marks, and having leading and trailing portions if there is overlap of the first and second marks, whose amplitudes are substantially different from one another and from the said one amplitude and whose durations are proportional to the amount of the overlap, and an electronic circuit discriminating between the amplitudes of the portions of the said composite signal and detecting means energized by the discriminating circuit for detecting which of the first and second marks is in overlap on one end, and the extent of such overlap.

9. A structure as claimed in claim 8 in which the discriminating means includes at least two control tubes normally not conducting, each tube connected with a bias control device having multiple bias establishing electrodes adapted to be of coincident conducting polarity to provide proper bias for its respective control tube, and a plurality of switching tubes responsive to different amplitudes and connected in combinations with the bias control devices such that only the first bias control device will have its bias establishing electrodes of coincident conducting polarity while the portion of said composite signal corresponding to an overlap of the first mark is applied to said switching tubes, and only the second bias control device will have its bias establishing electrodes of coincident conducting polarity while the portion of said composite signal corresponding to an overlap of the second mark is applied to said switching tubes, whereby each control tube will conduct only if there is overlap and only for the duration of its corresponding portion of the composite signal.

10. A structure as claimed in claim 8 in which the detecting means includes an output device having a pair of branches responsive respectively to the portions of said composite signal comprising overlap of the first and second marks and electrical circuits served by the respective branches, whereby a change will occur in one circuit only upon the passage of an overlap of the first mark, a change will occur in the second circuit only upon the passage of an overlap of the second mark, and no changes will occur in the event the superimposed area passes the scanner.

11. A structure as claimed in claim 9 in which the detecting means includes a pair of output circuits, separate reactive means controlling the output circuits, and the control tubes connected to the respective reactive means.

12. A structure as claimed in claim 9 in which the detecting means includes a pair of output circuits, separate reactive means controlling the output circuits, the control tubes connected to the respective reactive means, and means rendering the effect of the leading overlap portion of the composite signal ineffectual to cause activation of the particular output circuit it would otherwise activate, whereby the output circuit controlled by the trailing overlap portion alone is activated.

13. A structure as claimed in claim 12 in which the last-mentioned means includes a third control tube, means establishing a neutral no-signal potential level for said separate reactive means, and the switching tubes connected to said third control tube and re-setting said reactive means to said no-signal potential when the said one amplitude portion of said signal occurs.

14. In a registration control or indication device in which means are provided for detecting deviation in registration between consecutive operations performed upon a web element moving past two spaced operating stations, the improvement which comprises means at each station applying indicia to said web in substantial coincidence to provide a composite indicia made up of a first light reflective mark and a second light reflective mark of different optical properties, an optical scanner having photo-sensitive signal producing means responsive in different degree to light reflected from said first and second marks, and in a third degree to light reflected from any area of said composite indicia in which said marks are superimposed, the marks having the same length relative the direction of movement of the web element and being spaced to coincide in said composite indicia when registration in operations is achieved, but overlapping respectively on opposite ends of said composite indicia when the operations are not in registration, said photo-sensitive signal producing means being activated upon passage of said composite signal to produce a wave form having a portion of one amplitude for any said area of superimposed marks with a duration proportional to the length of said area of superimposed marks, and having leading and trailing portions if there is overlap of the first and second marks, whose amplitudes are substantially different from one another and from the said one amplitude and whose durations are proportional to the amount of overlap and an electronic circuit including an output device having a pair of branch circuits, one for each portion of the composite signal produced by passage of said first or second marks alone as overlap, and means responsive only to the trailing overlap of the composite signal, if there is such overlap, to activate the branch circuit of the output corresponding to the particular amplitude caused by whichever of said first and second marks said overlap comprises, said branch circuit being active only for the duration of said trailing overlap.

15. In a registration control or indication device in which means are provided for detecting deviations in registration upon a moving web element, there being two operating stations spaced along the web element and each adapted to perform an operation upon said web element consecutively and in registration, the improvement comprising means applying a first indicia of a first texture upon said web element at the first station, means applying a second indicia of a second texture upon said web element at said second station, the dimensions of said indicia along the direction of movement of the web element being equal and the relative positions of said stations being such that when registration of the operations is achieved, both of said indicia will be superimposed to produce an in-registration composite indicia of a substantially homogenous mixture of both of said textures whose dimension along the direction of movement of the web element is also equal to the same dimension of said first and second indicia, but when out of registration the first and second indicia will not be in alignment, thereby producing an out-of-registration composite indicia with an overall dimension in the direction of movement of the web element greater than either of said first and second indicia, said out-of-registration composite indicia having three portions, the leading portion being formed of one of said first and second textures, the trailing portion being formed of the other of said first and second textures, and the third and central portion being a superimposed area formed of the homogenous mixture of said textures, scanning means including a device photo-sensitive in different degree to said first, second and homogenous textures to produce signals therefor of different amplitude for each of said textures and of duration proportional to the length of said respective portions, and means responsive to said signals to detect the deviation from registration, if any.

16. In a multi-color printing registration control device in which a web moves past a pair of printing stations each applying an impression and the composite desired to be in registration, the improvement which comprises, a mark of one color printed at the first station, an identical mark of a second and different color printed at the second station and adapted to be superimposed in longitudinal coincidence upon the first mark for registration, an optical scanner including a photo-responsive element which produces a signal of minimum amplitude in scanning the first color alone, a signal of maximum amplitude in scanning the superimposed colors, and a signal of medium amplitude in scanning the second color, a discriminating circuit responsive in different branches for different amplitudes of input signal connected to receive the signal from said scanner, and an output device connected to said discriminating circuit and having two parts responsive respectively to signals of minimum and intermediate amplitudes, and control means for said output device including storage means for receiving signals from the discriminating circuit and applying same to the said output device, and said discriminating circuit including means responsive only to said signal of maximum amplitude to render said storage means ineffectual whereby only an overlap of one of said first and second colors at one end of the composite of said first and second marks will activate a part of said output device, and then only when the composite printing impressions are out of registration.

17. A structure as claimed in claim 1 in which switch means is provided operating in synchronism with one of said operating means and de-activating said discriminating and detecting means between passage of said applied indicia.

18. A registration control device for use with apparatus operating upon a moving web, said apparatus including a first operating station and a second operating station spaced along the web, means at each station for functionally operating upon said web with the resulting effect being a continuous registered manifestation of the operations of the respective stations, means for applying a first discrete indicia upon said web in synchronism with the first operation and of a first texture, means for applying a second discrete indicia upon said web in synchronism with said second operation and of a second texture, the textures having measurably different light reflective properties, a sensing device juxtaposed relative the web and scanning a single track along the length of said web spaced from an edge of said web, each of the indicia being applied to said web at lateral positions substantially aligned with said track so that the track passes through a substantially equal lateral and homogeneous portion of each, the indicia each having substantially the same lengthwise dimension and being applied to said web in such a manner that when registration of the operations has been achieved, there will be a discrete composite indicia made up of the first and second indicia having at least a portion of each superimposed with predetermined spatial relation between said superimposed portion and one end of said composite indicia, said superimposed portion providing a third texture of light reflective properties measurably different from the other two textures, the sensing device in scanning said composite indicia including means producing an output signal whose wave form has a different amplitude for each of said three textures which may appear in said composite indicia in the order of appearance, and discriminating means having said signal output applied thereto being sensitive to any differences in amplitude between the parts of said output signal and serving to detect the departure, if any, from said spatial relationship as a measure of the departure, if any, of said operations from registration.

References Cited in the file of this patent

UNITED STATES PATENTS

| | | |
|---|---|---|
| 2,497,909 | Poole | Feb. 21, 1950 |

FOREIGN PATENTS

| | | |
|---|---|---|
| 450,528 | Great Britain | Apr. 17, 1935 |
| 641,830 | Great Britain | Aug. 23, 1950 |
| 1,053,915 | France | Feb. 5, 1954 |